(12) United States Patent
Diachina et al.

(10) Patent No.: US 9,357,387 B2
(45) Date of Patent: May 31, 2016

(54) METHODS AND DEVICES FOR HANDLING ENCRYPTED COMMUNICATION

(75) Inventors: John Walter Diachina, Garner, NC (US); Paul Schliwa-Bertling, Ljungsbro (SE); Jari Vikberg, Järna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 223 days.

(21) Appl. No.: 14/006,371

(22) PCT Filed: Mar. 23, 2011

(86) PCT No.: PCT/SE2011/050327
§ 371 (c)(1),
(2), (4) Date: Sep. 20, 2013

(87) PCT Pub. No.: WO2012/128685
PCT Pub. Date: Sep. 27, 2012

(65) Prior Publication Data
US 2014/0010369 A1    Jan. 9, 2014

(51) Int. Cl.
*H04W 12/06* (2009.01)
*H04W 12/02* (2009.01)
(Continued)

(52) U.S. Cl.
CPC ............. *H04W 12/06* (2013.01); *H04W 12/02* (2013.01); *H04L 63/162* (2013.01); *H04W 4/18* (2013.01)

(58) Field of Classification Search
CPC ..... H04W 36/02; H04W 36/12; H04W 28/06; H04W 36/14; H04W 88/06; H04W 28/18; H04W 36/18; H04W 72/04; H04W 72/0413; H04W 72/0426; H04W 76/02; H04W 12/02; H04W 12/06; H04W 4/18; H04W 24/02; H04W 28/0247; H04W 28/065; H04W 72/0406; H04W 76/022; H04W 76/041; H04L 69/163; H04L 1/1877; H04L 69/16; H04L 1/1838; H04L 47/14; H04L 63/162; H04L 69/32; H04L 69/324; H04L 29/06945; H04L 29/06952; H04L 29/08018; H04L 29/08027; H04L 29/08036; H04L 67/2842; H04L 67/2847
USPC ......... 370/331, 352, 329, 328, 252, 349, 469, 370/254, 474; 455/422.1; 380/270
See application file for complete search history.

(56) References Cited

U.S. PATENT DOCUMENTS 6,208,620 B1    3/2001   Sen et al.
2001/0017850 A1*  8/2001   Kalliokulju ........... H04L 69/324
                                                    370/331
(Continued)

FOREIGN PATENT DOCUMENTS

WO     WO 2005/064868 A1     7/2005

OTHER PUBLICATIONS

L. Zhou, et al.; "Effect of TCP/LLC protocol interaction in GPRS networks", presented at Computer Communications, May 29, 2001, pp. 501-506.
(Continued)

*Primary Examiner* — Charles C Jiang
*Assistant Examiner* — Rose Clark
(74) *Attorney, Agent, or Firm* — Patent Portfolio Builders, PLLC

(57) ABSTRACT

By allowing the option of placing an Logical Link Control (LLC)-entity within the Base Station Subsystem (BSS) an improved system performance in the form of mobile stations experiencing reduced information acquisition times can be achieved by using a cache memory in the BSS. A method in the BSS can include receiving one or more LLC Packet Data Units (PDUs) from a mobile station, and extracting Sub Network (SN)-PDU(s) contained in each LLC PDU and reassembling the SN-PDU(s) to recover a single N-PDU. The N-PDU is determined to include a request for information using an LLC entity in the base station subsystem. Content of a cache memory in the base station subsystem is determined to correspond to the request for information indicated by the N-PDU. A response to the request for information from the mobile station is made using the content of cache memory in the base station subsystem.

19 Claims, 15 Drawing Sheets

(51) Int. Cl.
*H04L 29/06* (2006.01)
*H04W 4/18* (2009.01)

(56) References Cited

U.S. PATENT DOCUMENTS

| | | | | |
|---|---|---|---|---|
| 2001/0043579 | A1* | 11/2001 | Tourunen | H04L 12/08 370/331 |
| 2004/0156331 | A1* | 8/2004 | Wang | 370/328 |
| 2005/0185619 | A1* | 8/2005 | Niemela et al. | 370/331 |
| 2006/0146831 | A1* | 7/2006 | Argyropoulos et al. | 370/394 |
| 2007/0178916 | A1* | 8/2007 | Sorbara et al. | 455/458 |
| 2009/0034500 | A1* | 2/2009 | Wang | 370/338 |
| 2009/0137252 | A1* | 5/2009 | Masseroni et al. | 455/446 |
| 2010/0027467 | A1* | 2/2010 | Wu et al. | 370/328 |
| 2010/0034089 | A1 | 2/2010 | Kovvali et al. | |
| 2010/0215015 | A1* | 8/2010 | Miao et al. | 370/329 |
| 2011/0122839 | A1* | 5/2011 | Rexhepi et al. | 370/331 |

OTHER PUBLICATIONS

3GPP TS 44.064 V9.0.0 (Sep. 2009) $3^{rd}$ Generation Partnership Project; Technical Specification Group Core Network; Mobile Station—Serving GPRS Support Node (MS-SGSN); Logical Link Control (LLC) layer specification; (Release 9); 63 pages.

3GPP TS 44.065 V9.0.0 (Sep. 2009) $3^{rd}$ Generation Partnership Project; Technical Specification Group Core Network and Terminals; Mobile Station (MS)—Serving GPRS Support Node (SGSN); Subnetwork Dependent Convergence Protocol (SNDCP); (Release 9); 52 pages.

Supplementary European Search Report for European Application No. EP 11 86 1377, Aug. 8, 2014, 6 pages.

Bo Yang et al.: "Two-Level Proxy: The Media Streaming Cache Architecture for GPRS Mobile Network", Jan. 1, 2006, Information Networking. Advances in Data Communications and Wireless Networks Lecture Notes in Computer Science; LNCS, Springer, Berlin, DE, pp. 852-861, XP019050809, ISBN: 978-3-540-48563-6.

International Search Report, PCT/SE2011/050327, Dec. 15, 2011.

Written Opinion of the International Searching Authority, PCT/SE2011/050327, Dec. 15, 2011.

International Preliminary Report on Patentability, PCT/SE2011/050327, Jun. 12, 2013.

Balakrishnan Hari et al.; "Improving reliable transport and handoff performance in cellular wireless networks", Wireless Networks, Dec. 1, 1995, Springer Netherlands, Issn: 1022-0038, pp. 469-481, vol. 1, Issue 4; Retrieved from the Internet: Url:http://dx.doi.org/10.1007/BF01985757.

3GPP TS 23.060 V8.11.0, Dec. 20, 2010.

Office Action in EP application No. 11861377.7 mailed Sep. 11, 2014.

* cited by examiner

METHODS AND DEVICES FOR HANDLING ENCRYPTED COMMUNICATION

CROSS REFERENCE TO RELATED APPLICATION

This application is a 35 U.S.C. §371 national stage application of PCT International Application No. PCT/SE2011/050327, filed on 23 Mar. 2011, the disclosure and content of which is incorporated by reference herein in its entirety. The above-referenced PCT International Application was published in the English language as International Publication No. WO 2012/128685 A1 on 27 Sep. 2012.

TECHNICAL FIELD

The present invention relates to methods and devices for handling encrypted communication on the LLC layer.

BACKGROUND

In FIG. 1 a General Packet Radio Service (GPRS) network is depicted. The network depicted in FIG. 1 is further described in the Third Generation Partnership Project (3GPP) specification TS 23.060.

In order to provide encrypted communication between the mobile station and the cellular radio network encryption of the user plane on the Logical Link Control (LLC)-layer is provided. The network Logical Link Control (LLC) entity is located in the Serving GPRS Support Node (SGSN) and in the mobile station (MS). In FIG. 2, a view illustrating different entities and the corresponding interfaces in a GPRS network is shown. FIG. 2 depicts a Mobile Station (MS) connected to a Base Transceiver Station (BTS) of a GPRS network over a Um interface. The BTS is in turn connected to a Base Station Controller (BSC) over an Abis interface. The BSC is connected to SGSN over a Gb interface. For completeness FIG. 2 also shows that the SGSN is connected to a Gateway GPRS Support Node (GGSN) over a Gn interface and the GGSN is connected to the internet over a Gi interface.

In FIG. 3a the user plane protocol architecture in accordance with 3GPP TS 23.060 is depicted. FIG. 3b depicts (also in accordance with 3GPP TS 23.060) the control plane protocol architecture between MS and SGSN for the case of A/Gb-mode.

Further FIG. 4 shows the relative positioning of the Sub-Network Dependent Convergence Protocol (SNDCP) and LLC layers. The conveyance of Network Packet Data Units (N-PDUs) using the SNDCP/LLC protocol stack is performed as follows:

For the downlink case an N-PDU essentially consists of an application layer data packet to be delivered to a mobile station. Upon reception of an N-PDU the SNDCP layer applies compression (if needed) and then disassembles the resulting compressed packet into multiple Sub-Network PDUs (SN-PDUs) depending on configuration parameters that determine the maximum size of Logical Link PDUs (LL-PDUs). The SN-PDUs are passed to the LLC layer which then maps each SN-PDU into an LL-PDU, applies ciphering to each LL-PDU (if necessary), transmits the LL-PDUs to the BSS using the BSSGP transport layer and the BSS then transmits the LL-PDUs to the mobile station using the Radio Link Control (RLC) layer. Each received LL-PDU is unciphered (if ciphered) by the LLC layer at the mobile station and the SN-PDU contained therein is extracted and sent to the SNDCP layer. The SNDCP layer reassembles a set of one of more SN-PDUs to create an N-PDU and then decompresses the N-PDU (if compressed) to produce the original application layer data packet.

For the uplink case an N-PDU available for transmission at the mobile station is disassembled as described for the downlink case and the resulting LL-PDUs are transmitted from the mobile station to the Base Station Subsystem (BSS) using the RLC layer. The BSS relays each LL-PDU to the SGSN where the original N-PDU is recovered as described for the downlink case.

There is a constant desire to improve the performance in cellular radio networks and to improve the speed by which a mobile station within the cellular network can access information nominally provided by servers located in the data network.

Hence there exists an ongoing need for developing new methods and devices providing improved GPRS system operation as perceived by users of this service.

SUMMARY

It is an object of the present invention to provide an improved methods and devices to address the problems as outlined above.

This object and others are obtained by the methods and devices as set out in the appended claims.

As has been realized by the inventors, existing GPRS networks can be modified to comprise a cache memory in the Base Station Subsystem (BSS) which can be used in responding to certain information requests triggered by a mobile station for the case where the requested information is available within this cache memory. However the current standard 3GPP TS 23.060 is limited to supporting encryption of the user plane on the LLC-layer with the peer LLC entities located in the SGSN and mobile station. Since information transfers triggered by a mobile station will commonly make use of the LLC based encryption feature, current standards essentially preclude the use of a BSS cache memory based solution for reducing the time required for a mobile station to acquire information of interest. This is shown in FIG. 5 which considers a GSM (Global System for Mobile Communication)/EDGE (Enhanced Data Rates for GSM Evolution) Radio Access Network (GERAN) architecture. As such, there are no means currently available for the BSS to be aware of when LLC Packed Data Units (PDUs) are encrypted or possess the necessary parameters to perform the LLC PDU encryption/decryption for the case where it would be beneficial to have caching or content data available in the BSS (as opposed to the more time consuming approach of always routing content data requests to remote content servers).

As has further been realized by the inventors the same problem exists for UMTS (Universal Mobile Telecommunications System) Terrestrial Radio Access Network (UTRAN) architecture. The UTRAN Architecture is depicted in FIG. 6. In this case the encryption is performed in the Radio Network Controller (RNC) and the radio base station NodeB is lacking the necessary information to perform encryption/decryption decryption for the case where it would be beneficial to have caching or content data available in the NodeB compared to always routing content data requests to remote content servers.

By allowing the option of placing an LLC-entity within the Base Station Subsystem (BSS) an improved system performance in the form of mobile stations experiencing reduced information acquisition times can therefore be achieved. To support this option the BSS can be provided with all necessary LLC and Sub-Network Dependent Convergence Protocol (SNDCP) configuration parameters established as a result of Exchange Identifier (XID) negotiation performed between a mobile station and the SGSN as a result of Packet Data Protocol (PDP) Context activation/modification/deletion or Inter-SGSN Routing Area Update plus all additional information required for performing encryption/decryption. The additional information can include:

Kc (the ciphering key established during authentication procedures)

Ciphering Algorithm to be used

IOV-UI or IOV-IOC (32 bit random values generated by the SGSN)

OC (overflow counters associated with each Data Link Connection Identifier=Service Access Point Identifier (SAPI)+Temporary Logical Link Identifier (TLLI)).

The purpose of the LLC entity located in the BSS is to perform encryption of cached content data available within the BSS for transmission to a mobile station and decryption of the LLC PDUs containing content data requests received from a mobile station. That is, performing encryption and decryption of LLC PDUs at the BSS instead of at the SGSN allows for mobile stations to experience faster responses to their content data requests.

When a request from a mobile station cannot be fulfilled by the cache or content data in the BSS, the request can be handled in various ways. In accordance with one embodiment the BSS sends the decrypted and decompressed Network Packet Data Unit N-PDU to the SGSN. This will reduce the work load in the SGSN since the decryption and decompression functions will have already been performed for a given N-PDU with no loss of overall data security (i.e. the lack of encryption over the Gb interface does not pose a significant security threat). Given that an N-PDU might have been segmented prior to the transmission, the BSS may need to recover the N-PDU by assembling the information carried in multiple LLC PDUs using the information available in the LLC and SNDCP headers. In accordance with an alternative embodiment the encrypted LLC PDU is sent from the BSS to the SGSN and the SGSN performs the decryption (at the LLC layer), decompression and assembly (at the SNDCP layer).

In accordance with one embodiment a method in a base station subsystem is provided. The method comprises receiving a one or more Logical Link Control, LLC, Packet Data Units, PDUs from a mobile station, and extracting Sub Network (SN)-PDU(s) contained in each LLC PDU and reassembling the SN-PDU(s) to recover a single N-PDU. Then it determined if the N-PDU comprises a request for information using an LLC entity in the base station subsystem, and if the content of a cache memory in the base station subsystem corresponds to the request for information indicated by the N-PDU. The BSS then responds to the request for information from the mobile station using the content of cache memory in the base station subsystem.

In particular the response can be generated by first generating a response N-PDU, disassembling the response N-PDU into one or more SN-PDUs, mapping each SN-PDU to one or more LLC PDU, and transmitting the LLC PDU(s) to the mobile station.

In accordance with one embodiment the BSS can recover the N-PDU by assembling the information contained in multiple LLC PDUs using the information available in the LLC and the SNDCP headers.

In accordance with one embodiment the method further comprises receiving LLC and Sub-Network Dependent Convergence Protocol, SNDCP, configuration parameters data from a Serving GPRS Support Node, SGSN to allow for reassembly of an N-PDU from one or more LLC PDUs received from a given mobile station. The configuration parameters data can include, the ciphering key established during authentication procedures, a Ciphering Algorithm to be used, 32 bit random values generated by the SGSN, and overflow counters associated with each Data Link Connection Identifier.

In accordance with one embodiment the LLC entity in the BSS is created in response to a message from an SGSN.

In accordance with one embodiment the LLC entity in the BSS is modified in response to a message from an SGSN.

In accordance with one embodiment the LLC entity in the BSS is deleted in response to a message from an SGSN.

In accordance with one embodiment the method comprises updating the LLC entity in the BSS such that the LLC entity in the BSS is associated with a new Temporary Logical Link Identifier value upon detecting that a new TLLI value has been assigned to replace an old TLLI value of the LLC entity.

In accordance with one embodiment a method in a SGSN is provided. The method comprises triggering a creation of a Logical Link Control LLC entity in a Base station Subsystem, BSS, connected to the SGSN, and signaling a creation of an LLC entity in the BSS to the BSS in response to the triggered creation.

In accordance with one embodiment the triggering is set to occur when a given LLC entity is determined to be configured and ready for use in the SGSN as a result of completing an Exchange Identifier, XID, negotiation procedure between the SGSN and a mobile station.

In accordance with one embodiment the SGSN signals a modification of an LLC entity in the BSS to the BSS. In accordance with one embodiment the modification of an LLC entity is triggered when the XID configuration parameters or other encryption related information associated with a mobile station have been modified in the SGSN.

In accordance with one embodiment the SGSN signals a deletion of an LLC entity in the BSS to the BSS. In accordance with one embodiment the deletion of an LLC entity is triggered when an SGSN determines that a mobile station has detached from the network or a Packet Data Protocol, PDP, Context associated with a specific mobile station has been deleted.

Similar principles can be applied in the downlink direction with the LLC entity located in the BSS. In accordance with one embodiment the BSS decrypts internet content to be forwarded to a mobile station and store the decrypted internet content in the cache memory. In one exemplary embodiment the LLC in the BSS can be adapted to perform decryption of content being forwarded to mobile stations from the internet to enable storing of this information in the cache memory. When the decrypted information has been stored in the cache memory, or in parallel with this, the encrypted information can be forwarded in a conventional manner to the mobile stations. The SGSN knows that the BSS contains a LLC entity. There are then different options. For example either the SGSN performs the encryption and compression as in existing systems and forwards the LLC PDUs to the BSS. Alternatively the SGSN sends the N-PDU received from the GGSN within a GPRS Tunneling Protocol (GTP) PDU to the LLC entity within the BSS which maps the N-PDU into one or more Sub-Network (SN)-PDUs, maps each SN-PDU into an LLC PDU and encrypting each LLC PDU if required. To support an introduction of an LLC entity in the BSS new procedures, messages and information elements can be specified on the GB interface.

In accordance with one embodiment the peer LLC-entities as defined by existing 3GPP specifications remain located in the SGSN and the mobile station. In that case there will be no impact on the signaling between the mobile stations and the SGSN.

The invention also extends a base station subsystem and a central node in a cellular radio system such as a SGSN or RNC arranged to perform the above methods. The base station subsystem and central node can be provided with a controller/controller circuitry for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawing, in which.

DETAILED DESCRIPTION

In a GPRS radio system, when a mobile station establishes a connection with a SGSN, the SGSN can be made aware of the serving BSS the mobile station used to contact it. The SGSN can be made aware of the serving BSS when PDP Context activation is performed (MS initiated case) or XID negotiation is performed (MS initiated case) prior to the establishment of a TBF for that mobile station. This can be achieved by creating an association of, for example, a Network Service Entity Identifier (NSEI) or a set of NSEIs with the particular serving BSS managing the mobile station.

Figure 1:
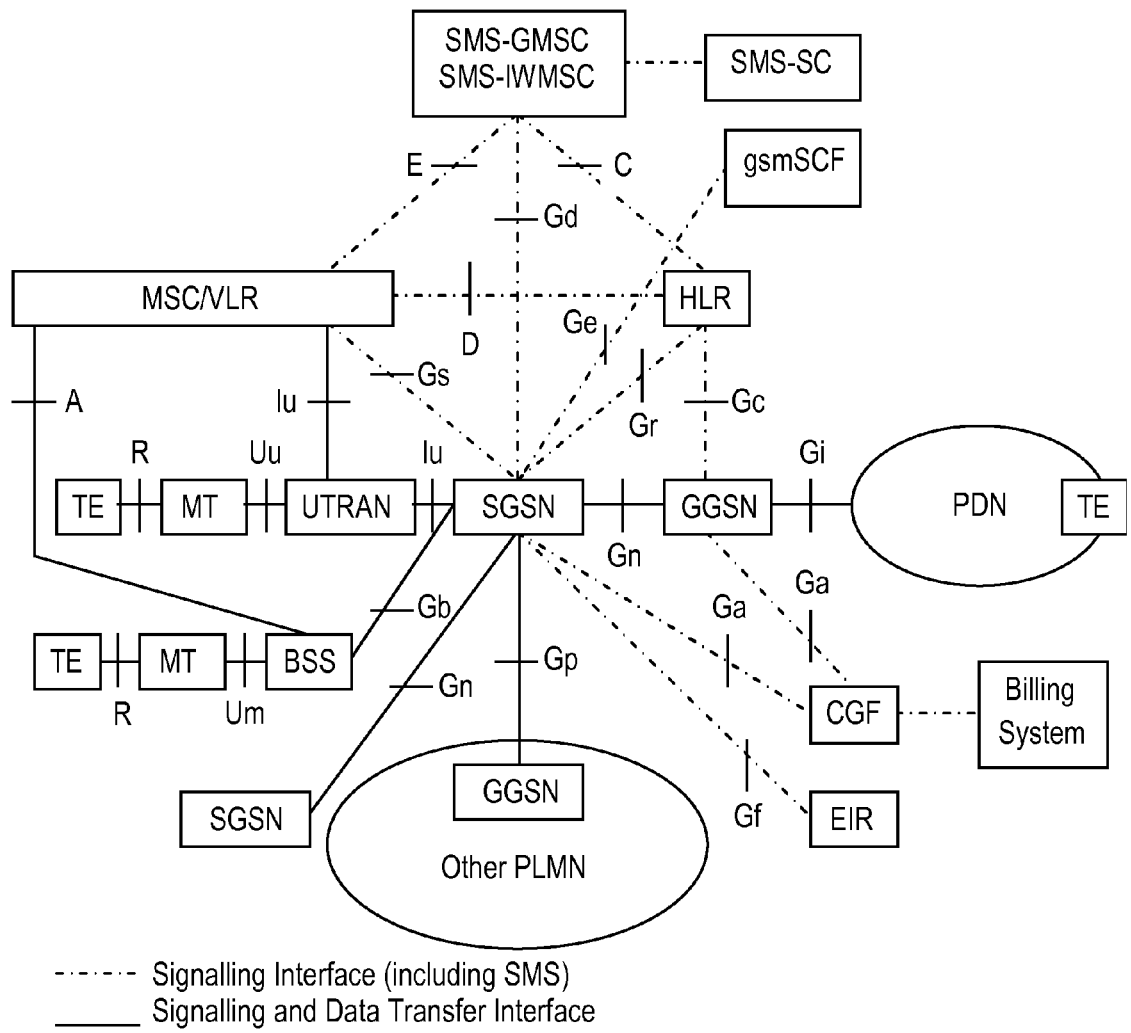
FIG. 1 is a view of a General Packet Radio Service (GPRS) network cellular radio system including the connection to the core network (CN)
Figure 2:
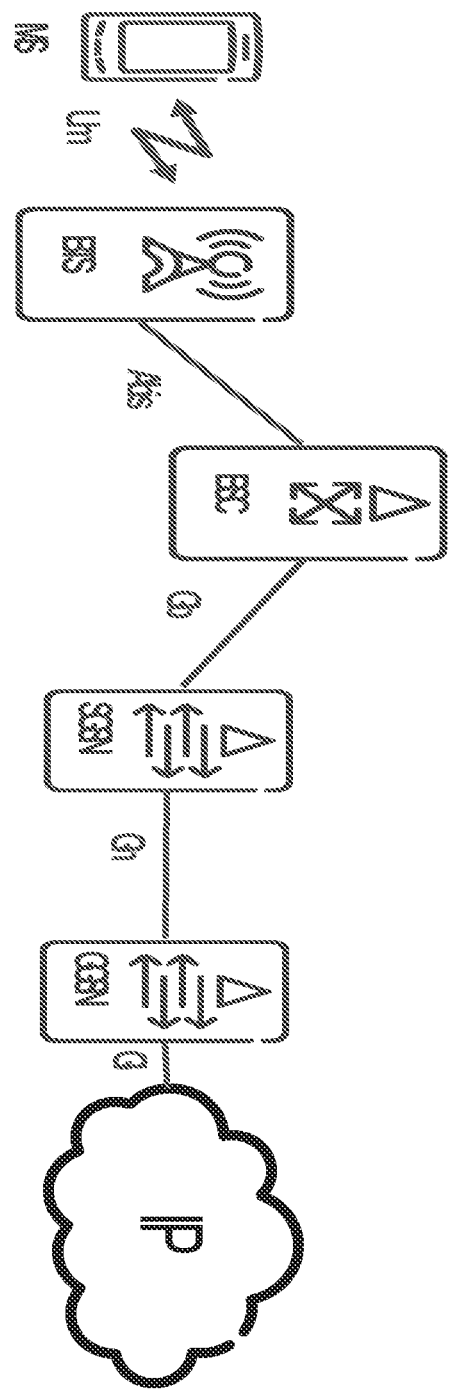
FIG. 2 is a view illustrating different entities and the corresponding interfaces in a GPRS network.
Figure 3A:
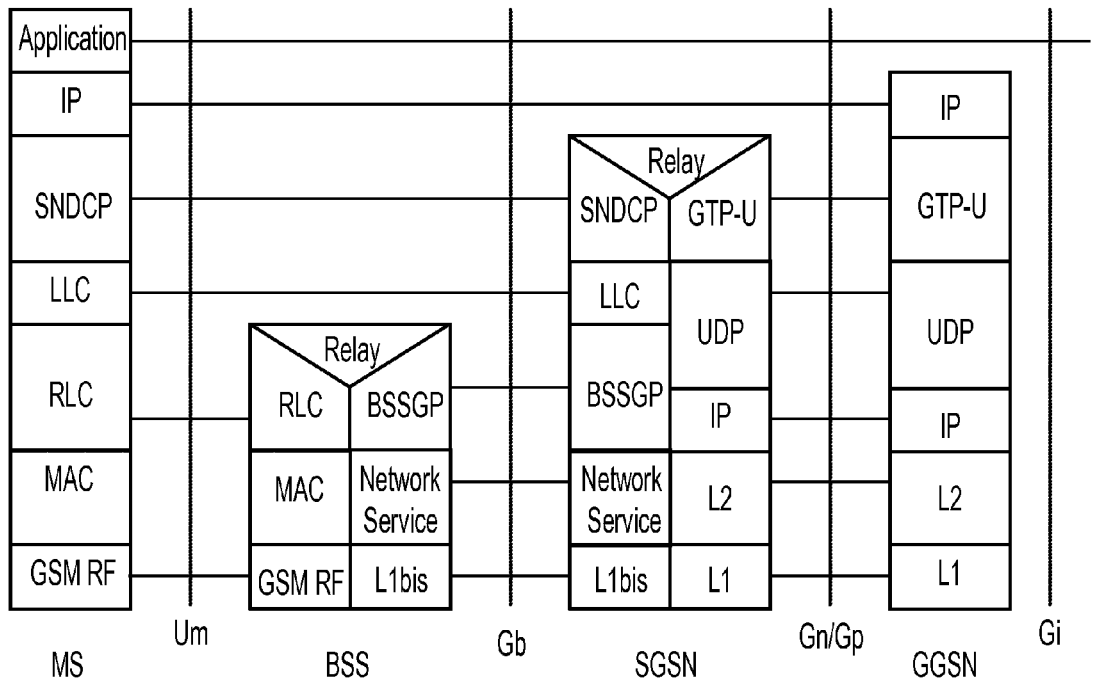
FIG. 3a depicts the user plane protocol architecture in accordance with 3GPP TS 23.060.
Figure 3B:
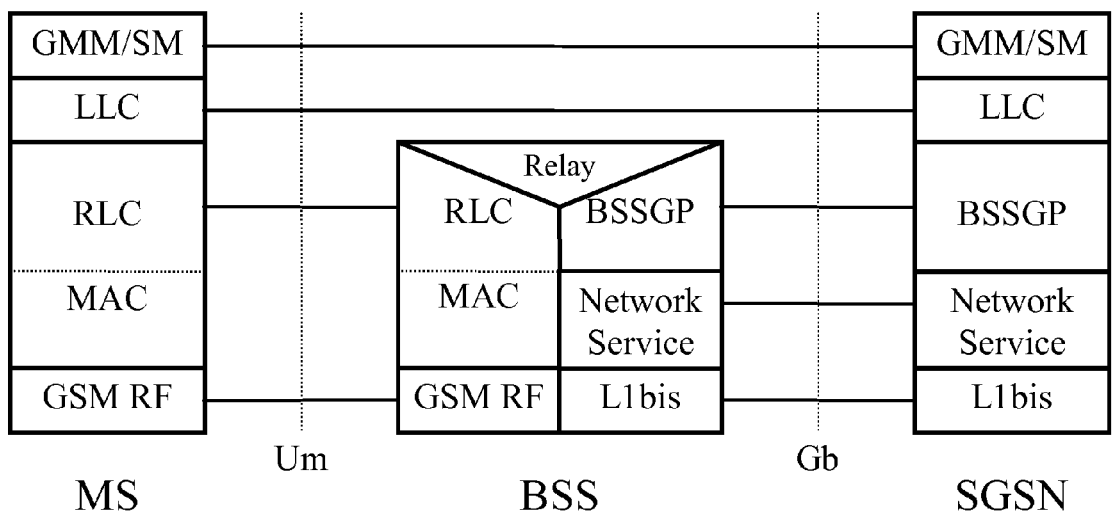
FIG. 3b depicts the control plane protocol architecture between MS and SGSN for the case of A/Gb-mode.
Figure 4:
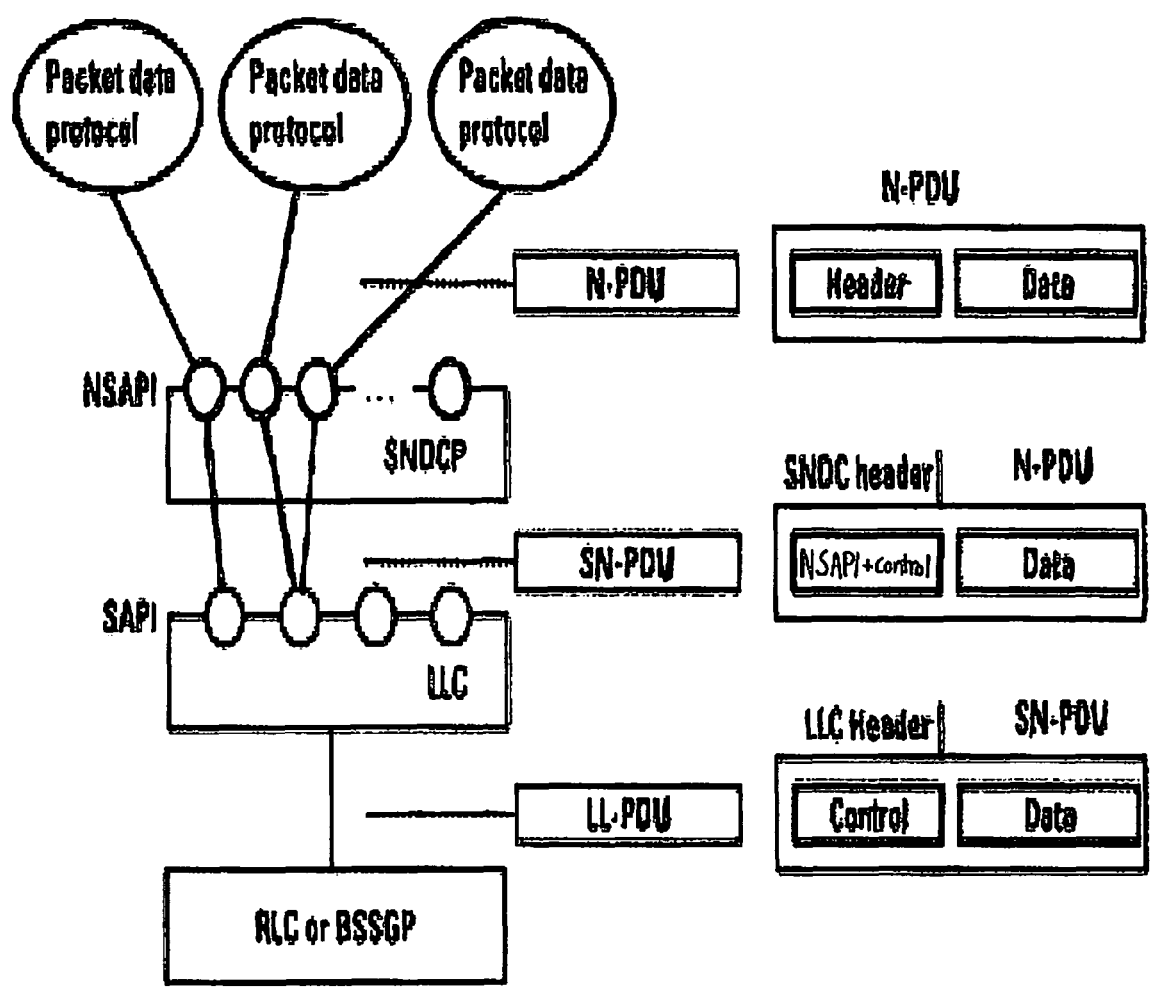
FIG. 4 shows the relative positioning of the Sub-Network Dependent Convergence Protocol (SNDCP) and LLC layers.
Figure 5:
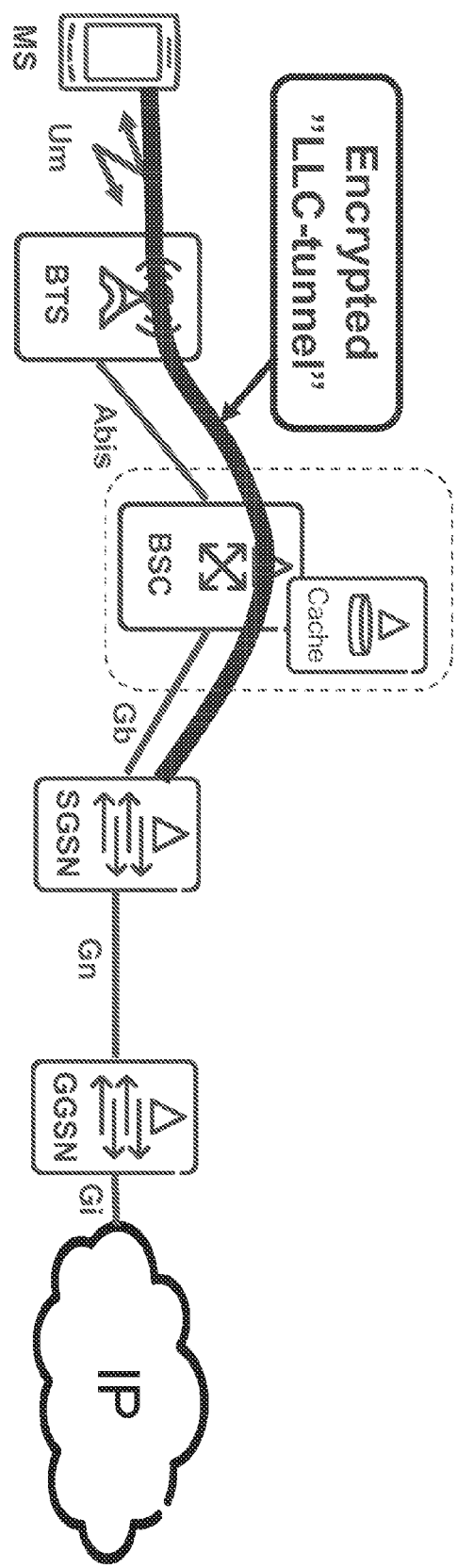
FIG. 5 illustrates LLC based encryption for GERAN.
Figure 6:
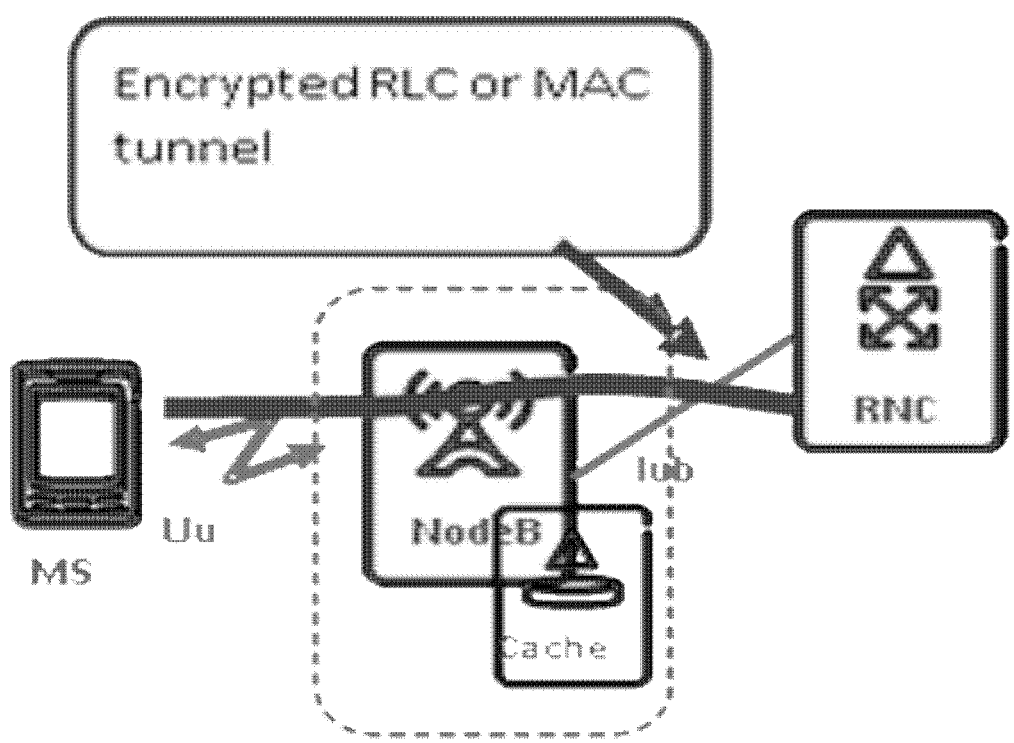
FIG. 6 illustrates RLC and MAC based encryption for UTRAN.
Figure 7:
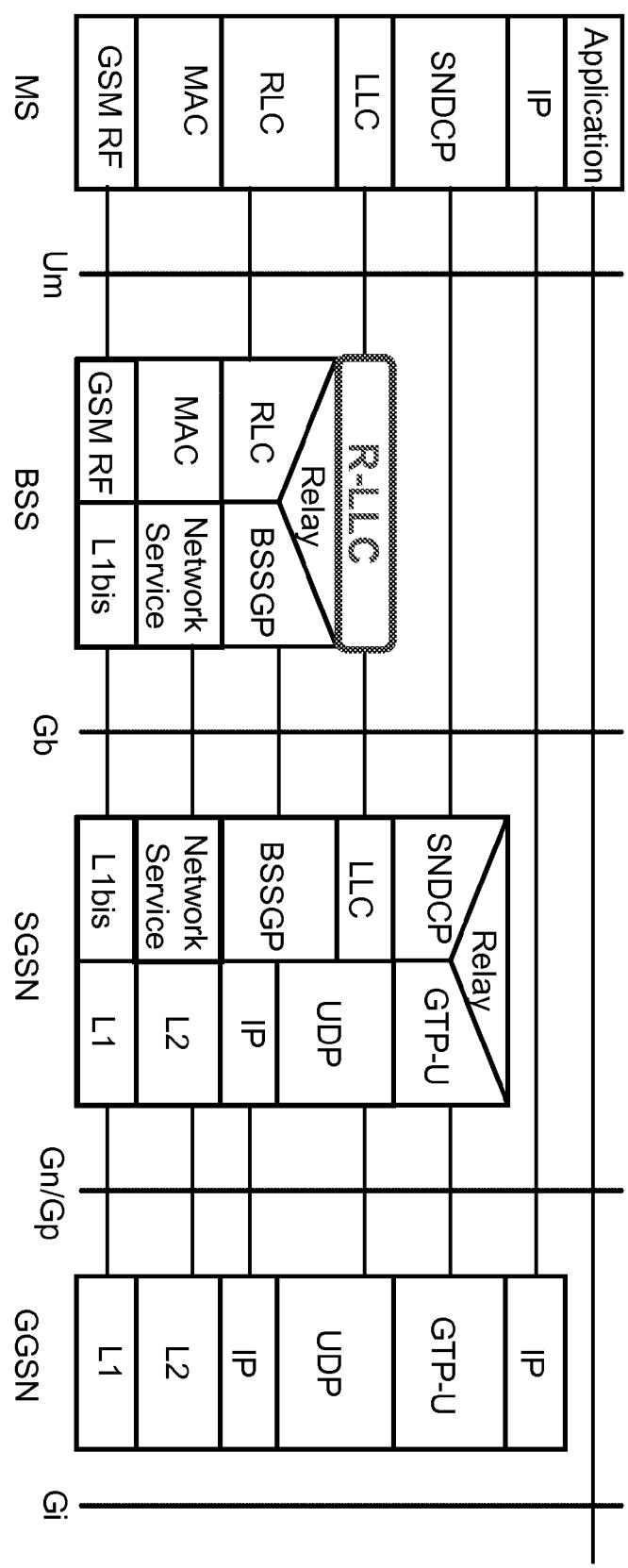
FIG. 7 depicts a logical view of the location of an LLC entity in a serving BSS.

This knowledge, i.e. the knowledge of which serving BSS the mobile station is using, can then be used by a central node, in particular the SGSN (or an RNC for UTRAN) to create an LLC entity in that serving BSS. In the following examples the central node is exemplified by a SGSN, but it is understood that the description applies equally to an RNC in the case of UTRAN. The LLC can further be associated with the particular mobile station for example using the Temporary Logical Link Identifier (TLLI) as an address. The same knowledge about for example an NSEI or a set of NSEIs can be used by the SGSN to delete an-LLC entity when the SGSN detects that the MS has moved to another BSS. In FIG. 7 a logical view of the location of an LLC entity in a serving BSS is depicted, where R-LLC (a remote LLC entity) in the BSS is the LLC entity that can be added or removed in the BSS by the SGSN. The LLC entity in the BSS can thus be controlled and managed from the SGSN.

Upon completing XID negotiation for a specific mobile station the SGSN can convey all LLC layer and SNDCP layer configuration parameters to the serving BSS associated with that mobile station. The additional information can include:

Kc (the ciphering key established during authentication procedures)

Ciphering Algorithm to be used

IOV-UI or IOV-IOC (32 bit random values generated by the SGSN)

OC (overflow counters associated with each Data Link Connection Identifier=Service Access Point Identifier (SAPI)+Temporary Logical Link Identifier (TLLI)).

At each LLC PDU transfer either originated from the mobile station or from the SGSN, the TLLI is made available to the serving BSS. Thus it can be used to find the associated LLC entity in the BSS and the information needed to perform the encryption or decryption of LLC PDUs associated with indicated TLLI.

In one exemplary embodiment the LLC in the BSS can be adapted to perform decryption of content being forwarded to mobile stations from the internet to enable storing of this information in the cache memory. When the decrypted information has been stored in the cache memory, or in parallel with this, the encrypted information can be forwarded in a conventional manner to the mobile stations. The SGSN knows that the BSS contains a LLC entity. There are then different options. For example either the SGSN performs the encryption and compression as in existing systems and forwards the LLC PDUs to the BSS. Alternatively the SGSN sends the N-PDU received from the GGSN within a GPRS Tunnelling Protocol (GTP) PDU to the LLC entity within the BSS which maps the N-PDU into one or more Sub-Network (SN)-PDUs, maps each SN-PDU into an LLC PDU and encrypting each LLC PDU if required. To support an introduction of an LLC entity in the BSS new procedures, messages and information elements can be specified on the Gb interface.

Figure 8:
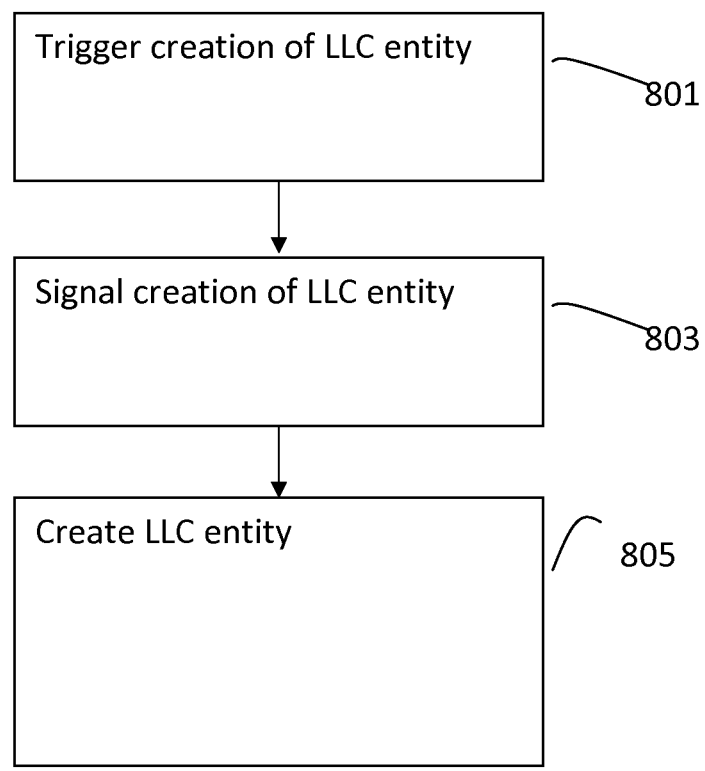
FIG. 8 is a flowchart illustrating a procedure for creating an-LLC entity in the BSS.

In order for the SGSN to create an LLC entity in the BSS, the following steps depicted in FIG. 8 can be performed between the SGSN and the BSS and signaled on the Gb interface. First in a step 801 creation of an -LLC entity is triggered in the SGSN. The trigger can for example occur when a given LLC entity is determined to be configured and ready for use in the SGSN as a result of completing the XID negotiation procedure between the SGSN and a given mobile station. When the creation of an LLC entity is triggered the SGSN signals a creation of an LLC entity in the BSS, step 803. In response to receiving the message signaled in step 803, the BSS will create an LLC entity in a step 805. The LLC entity can be associated with a specific TLLI. The specific information required for encryption/de-cryption is available when the GSM security context has been established and stored in the MS and the network as a result of a successful execution of a GSM authentication challenge. The GSM security context for the Packet Switched (PS) domain consists of the ciphering algorithm, the GPRS GSM ciphering key and the GPRS ciphering key sequence number.

Figure 9:
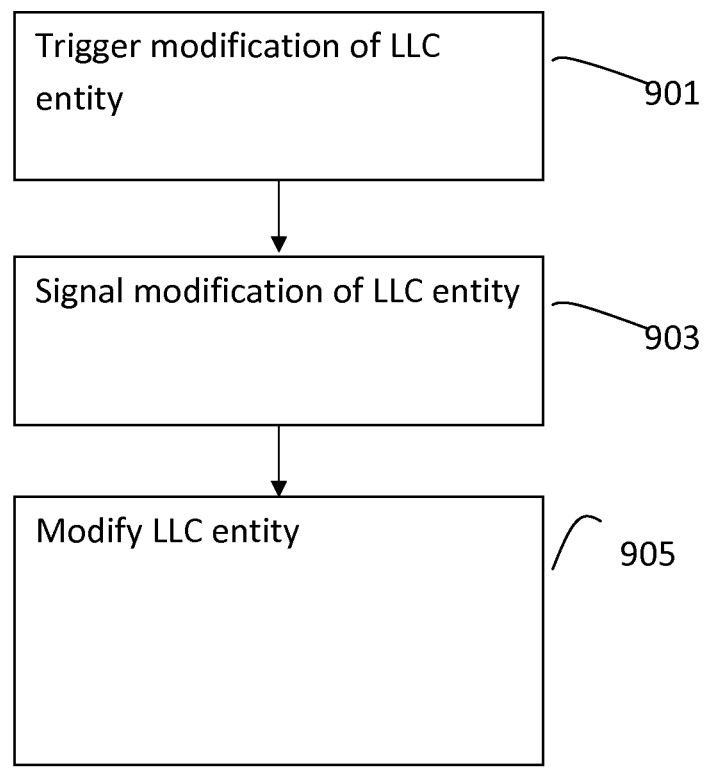
FIG. 9 is a flowchart illustrating a procedure for modifying an-LLC entity in the BSS.

In order for the SGSN to modify an LLC entity in the BSS, the following steps depicted in FIG. 9 can be performed between the SGSN and the BSS and signaled on the Gb interface. First in a step 901 modification of an LLC entity is triggered in the SGSN. The trigger can, for example, be set to occur when the XID configuration parameters or some other encryption related information associated with a given mobile station (see above) have been modified in the SGSN. When the modification of an LLC entity is triggered the SGSN signals a modification of an LLC entity in the BSS, step 903. In response to receiving the message signaled in step 903, the BSS will modify the corresponding LLC entity in a step 905.

Figure 10:
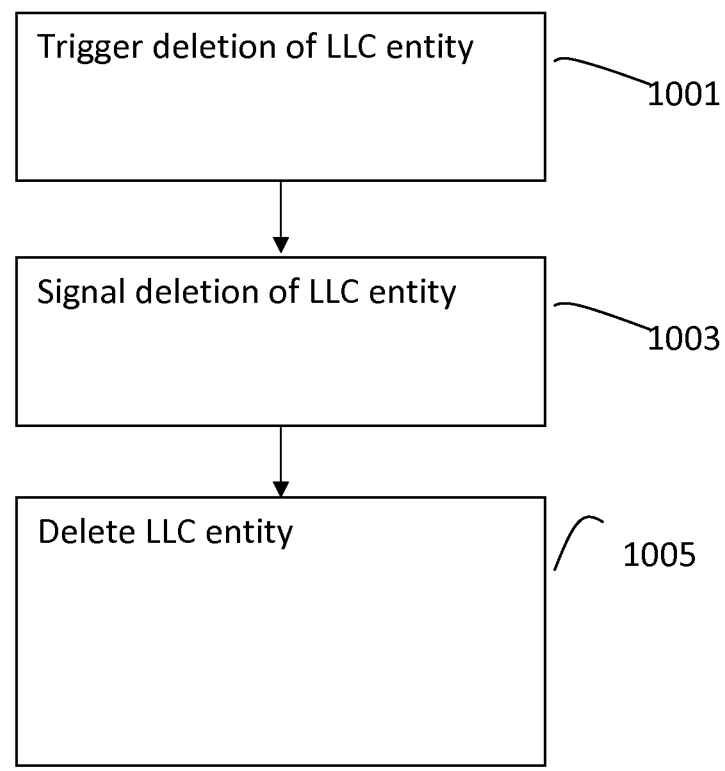
FIG. 10 is a flowchart illustrating a procedure for deleting an-LLC entity in the BSS.

In order for the SGSN to delete an LLC entity in the BSS, the following steps depicted in FIG. 10 can be performed between the SGSN and the BSS and signaled on the Gb interface. First in a step 1001 deletion of an LLC entity is triggered in the SGSN. The trigger can for example occur when an SGSN determines that a mobile station has detached from the network or a PDP Context associated with a specific mobile station has been deleted or when any other appropriate condition for deleting an LLC entity in the BSS arises. When the deletion of an LLC entity is triggered, the SGSN signals a deletion of an LLC entity in the BSS, step 1003. In response to receiving the message signaled in step 1003, the BSS will delete the corresponding LLC entity in a step 1005.

Figure 11:
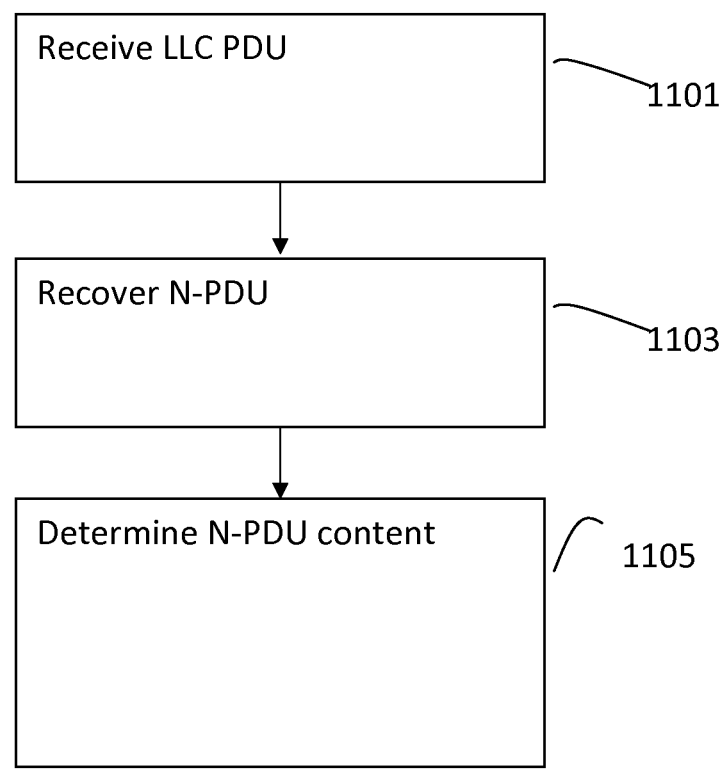
FIG. 11 is a flowchart illustrating a procedure for inspecting an LLC PDU in the BSS.

In order for the BSS to inspect an LLC PDU, the following steps depicted in FIG. 11 can be performed by an LLC entity in the BSS. First in a step 1101 the BSS receives an LLC PDU from the mobile station associated with a TLLI for which an LLC entity exists in the BSS. Next in a step 1103 the LLC entity in the BSS applies decryption at the LLC layer (if needed), re-assembles SN-PDUs at the SNDCP layer and applies decompression (if needed) in order to recover an N-PDU. The content of a single SN-PDU or multiple SN-PDUs will be used to reassemble a single N-PDU which is then analyzed in a step 1105 to determine if the BSS has cached content data corresponding to the request indicated by the N-PDU. If corresponding cached data is present in the BSS it can provide a response to the request from the MS without having to forward the request to the SGSN. This will be further described immediately below.

Figure 12:
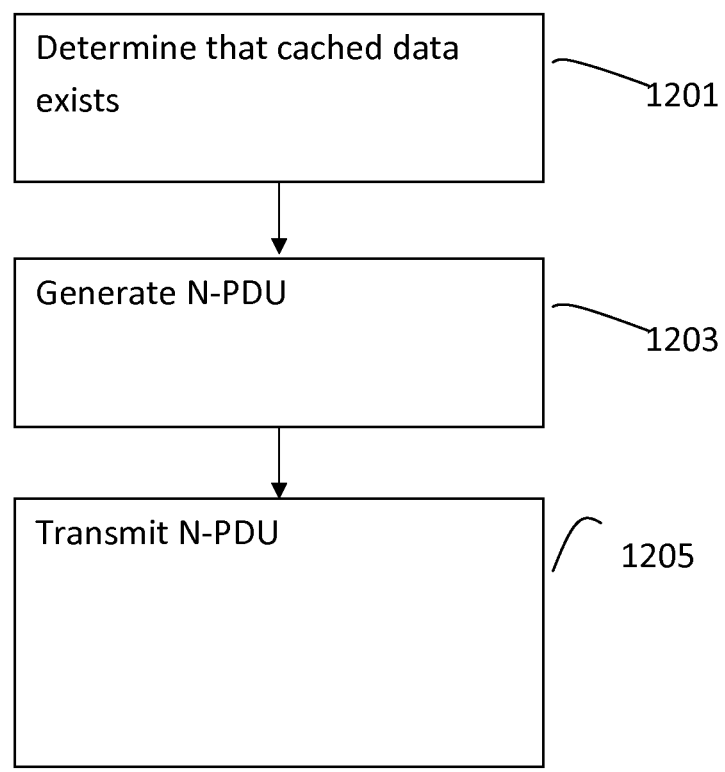
FIG. 12 is a flowchart illustrating a procedure for generating an LLC PDU in the BSS.

In order for the BSS (more specifically the LLC entity within the BSS) to generate an N-PDU that provides a response to a request received from a mobile station, the following steps depicted in FIG. 12 can be performed in the BSS. First in a step 1201 the BSS determines that it has cached content data corresponding to a request indicated by an N-PDU received from a given mobile station. This can for example be determined as described above in conjunction with step 1105. When the BSS determines that it has such cached content data, the BSS in a step 1203 generates an N-PDU containing the response. The BSS will compress the N-PDU as needed and segment the N-PDU into one or more SN-PDUs as necessary. The BSS then maps each SN-PDU into an LLC PDU and applies encryption to each LLC PDU as needed. The N-PDU generated in step 1203 is then transmitted to the corresponding mobile station in a step 1205. This can be performed by using one more LLC PDUs generated by the -LLC entity in the BSS.

Figure 13:
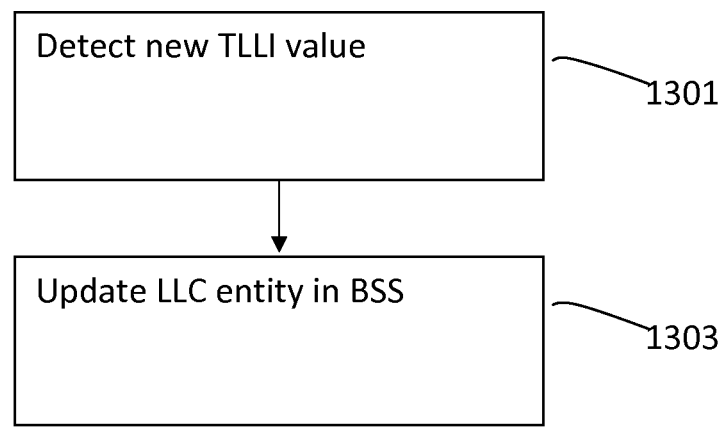
FIG. 13 is a flowchart illustrating a procedure for maintaining the association of an LLC entity with a TLLI in the BSS

In order for the BSS to correctly maintain the association of an LLC entity with a TLLI, the following steps depicted in FIG. 13 can be performed in the BSS. First, in a step 1301 a BSS detects that a new TLLI value has been assigned to replace an old TLLI value for which an LLC entity in the BSS exists. When this condition is detected in step 1301 the BSS updates the LLC entity in the BSS such that the LLC entity in the BSS is associated with a new TLLI value in a step 1303. The LCC entity may also be simultaneously associated with multiple TLLI values corresponding to the same mobile station, for example during the change of TLLI until both the network and the mobile station have synchronized and started using the new TLLI.

Figure 14:
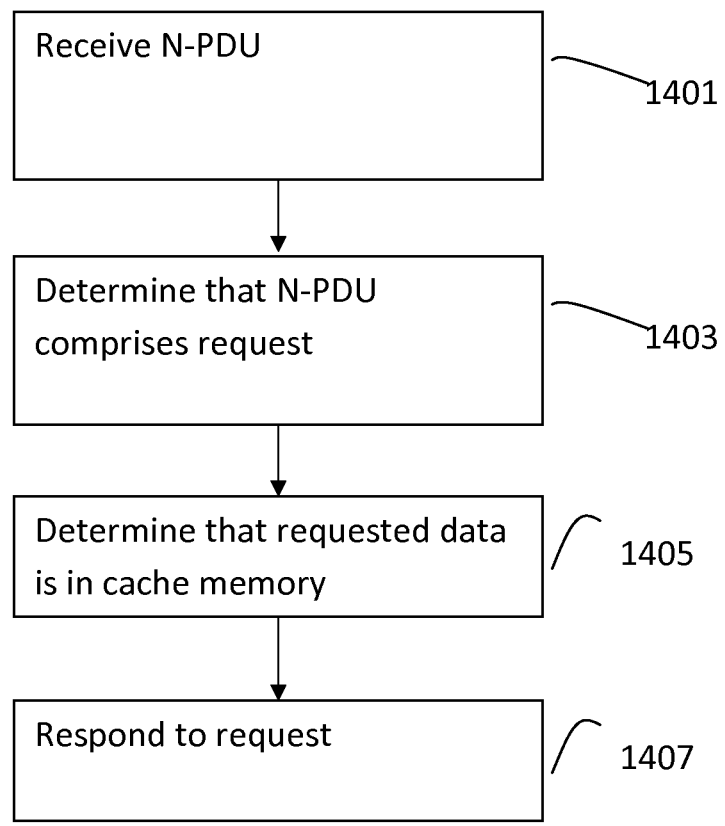
FIG. 14 is a flowchart illustrating a procedure performed in a BSS when responding to a request from a mobile station.

Thus, in accordance with the above procedures the following procedural steps illustrated in FIG. 14 can be performed in a base station subsystem (BSS) comprising a cache memory when responding to a request from a mobile station. First, in a step 1401 the BSS receives one or more LLC PDUs from a mobile station and reassembles the SN-PDUs therein to recover a single N-PDU. Upon inspecting the received N-PDU the BSS in a step 1403 determines that the N-PDU comprises a request for information using an LLC entity in the base station subsystem. Then the BSS, in a step 1405 determines that content of the cache memory in the base station subsystem corresponds to the request for information indicated by the N-PDU. In response to determining that content of the cache memory in the base station subsystem corresponds to the request for information the BSS in a step 1407 responds to the request for information from the mobile station using the content of cache memory in the base station subsystem.

In particular the response can be generated by performing the following steps. First a response N-PDU is generated. The response N-PDU is then optionally compressed (if necessary). The N-PDU is then disassembled into one or more SN-PDUs where each SN-PDU is mapped into an LLC PDU and optionally ciphered (if necessary) and finally transmitted to the mobile station.

Figure 15:
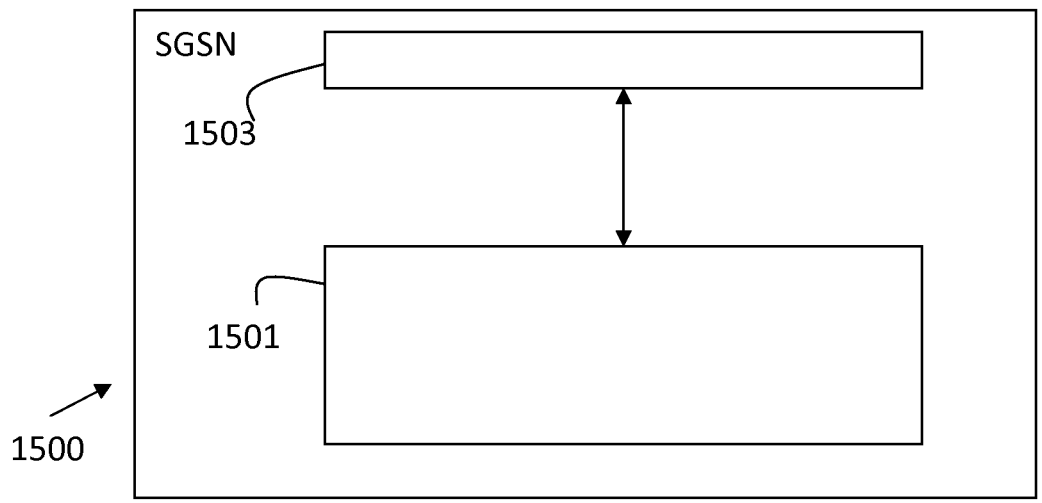
FIG. 15 is a general view of a BSS.

In FIG. 15 an SGSN 1500 is schematically depicted. The SGSN 1500 comprises controller circuitry 1501 for performing all the procedures described herein. The controller circuitry 1501 can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media. In addition the SGSN 1500 comprises an input/output device 1503 for receiving/transmitting data to the BSS.

Figure 16:
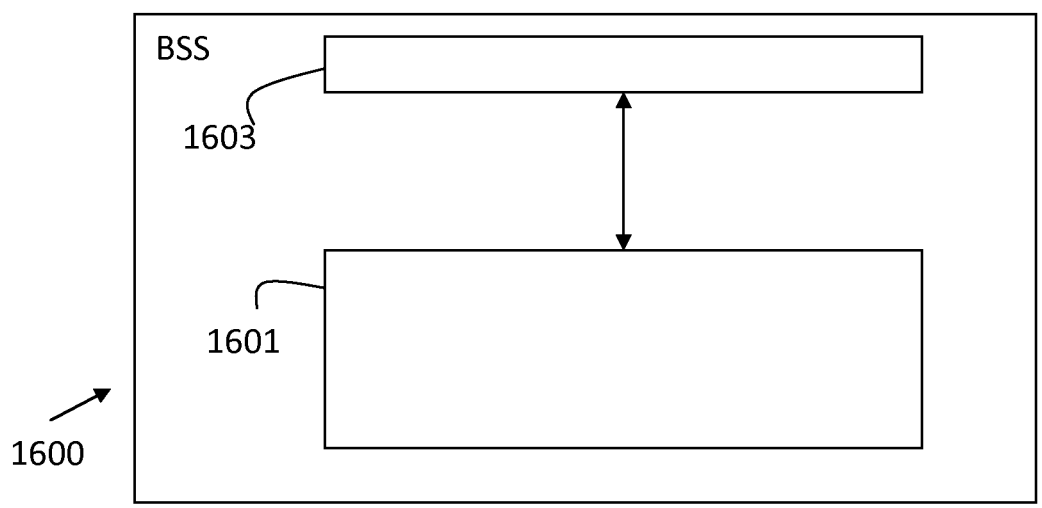
FIG. 16 is a general view of a SGSN

Further, in FIG. 16 a BSS 1600 is schematically depicted. The BSS 1600 comprises controller circuitry 1601 for performing all the procedures described herein. The controller circuitry 1601 can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media. In addition the BSS 1600 comprises an input/output device 1603 for receiving/transmitting data to the SGSN and also for communicating with user equipments.

Using the methods and devices as described herein can result in a number of advantages being achieved. First, the delay in providing a mobile station with the requested content data is reduced. Also the load of the Gb interface is reduced by avoiding the transmission of content data requests and corresponding responses over this interface. The load on the SGSN can further be reduced by having the BSS respond to content data requests whenever possible (i.e. without involving the SGSN). In addition it is also possible to relay information about the nature of the content data requested by a mobile station to the Resource management function within the BSS which may be able to use that information to optimize resource utilization.

The invention claimed is:

1. A method in a base station subsystem (BSS), the method comprising:
   receiving, by the base station subsystem, one or more Logical Link Control (LLC) Packet Data Units (PDUs) from a mobile station, and extracting Sub Network (SN)-PDUs contained in each LLC PDU and reassembling the SN-PDUs to recover a single N-PDU,
   determining, by the base station subsystem, that the N-PDU comprises a request for information using an LLC entity in the base station subsystem,
   determining, by the base station subsystem, that content of a cache memory in the base station subsystem corresponds to the request for information indicated by the N-PDU,
   responding, by the base station subsystem, to the request for information from the mobile station using the content of the cache memory in the base station subsystem, and
   receiving LLC and Sub-Network Dependent Convergence Protocol (SNDCP) configuration parameters data from a Serving GPRS Support Node (SGSN) to create the LLC entity in the base station subsystem, wherein the base station subsystem is a base station subsystem in a General Packet Radio System (GPRS) according to 3GPP TS 23.060 and wherein the base station subsystem communicates with the SGSN over a Gb interface.

2. The method according to claim 1, wherein the step of responding including generation of a response comprises:
   generating a response N-PDU,
   disassembling the response N-PDU into one or more SN-PDUs,
   mapping each SN-PDU to one or more LLC PDUs, and
   transmitting the one or more LLC PDUs to the mobile station.

3. The method according to claim 1, wherein the configuration parameters data include a ciphering key established during authentication procedures, a Ciphering Algorithm to be used, 32-bit random values generated by the SGSN, and overflow counters associated with each Data Link Connection Identifier.

4. The method according to claim 1, wherein the LLC entity in the BSS is created in response to a message from the SGSN.

5. The method according to claim 1, wherein the LLC entity in the BSS is modified in response to a message from the SGSN.

6. The method according to claim 1, wherein the LLC entity in the BSS is deleted in response to a message from the SGSN.

7. The method according to claim 1, further comprising updating the LLC entity in the BSS such that the LLC entity in the BSS is associated with a new Temporary Logical Link Identifier (TLLI) value upon detecting that a new TLLI value has been assigned to replace an old TLLI value of the LLC entity.

8. The method according to claim 1, further comprising encrypting each LLC PDU transmitted to the mobile station.

9. The method according to claim 1, further comprising decrypting internet content to be forwarded to the mobile station and storing the decrypted internet content in the cache memory.

10. A base station subsystem (BSS) comprising:
    an input/output device for receiving and decrypting one or more Logical Link Control (LLC) Packet Data Units (PDUs) from a mobile station,
    a controller circuitry configured for:
       extracting Sub Network (SN)-PDUs contained in each received LLC PDU and reassembling them to recover a single N-PDU,
       determining that the N-PDU comprises a request for information using an LLC entity in the base station subsystem,
       determining that content of a cache memory in the base station subsystem corresponds to the request for information indicated by the N-PDU,
       responding to the request for information from the mobile station using the content of the cache memory in the base station subsystem, and
       receiving LLC and Sub-Network Dependent Convergence Protocol (SNDCP) configuration parameters data from a Serving GPRS Support Node (SGSN) to create the LLC entity in the base station subsystem, wherein the base station subsystem is a base station subsystem in a General Packet Radio System (GPRS) according to 3GPP TS 23.060 and wherein the base station subsystem communicates with the SGSN over a Gb interface.

11. The base station subsystem according to claim 10, wherein the controller circuitry is configured to:
    respond to the request for information from the mobile station by generating a response N-PDU,
    disassemble the response N-PDU into one or more SN-PDUs,
    map each SN-PDU to one or more LLC PDUs, and
    transmit the one or more LLC PDUs to the mobile station.

12. The base station subsystem according to claim 10, wherein the configuration parameters data include a ciphering key established during authentication procedures, a Ciphering Algorithm to be used, 32-bit random values generated by the SGSN, and overflow counters associated with each Data Link Connection Identifier.

13. The base station subsystem according to claim 10, wherein the controller circuitry is adapted to create the LLC entity in the BSS in response to a message from the SGSN.

14. The base station subsystem according to claim 10, wherein the controller circuitry is adapted to modify the LLC entity in the BSS in response to a message from the SGSN.

15. The base station subsystem according to claim 10, wherein the controller circuitry is adapted to delete the LLC entity in the BSS in response to a message from the SGSN.

16. The base station subsystem according to claim 10, wherein the controller circuitry is adapted to update the LLC entity in the BSS such that the LLC entity in the BSS is associated with a new Temporary Logical Link Identifier (TLLI) value upon detecting that a new TLLI value has been assigned to replace an old TLLI value of the LLC entity.

17. The base station subsystem according to claim 10, wherein the controller circuitry is adapted to encrypt each LLC PDU transmitted to the mobile station.

18. The base station subsystem according to claim 10, wherein the controller circuitry is adapted to decrypt internet content to be forwarded to the mobile station and store the decrypted internet content in the cache memory.

19. The method according to claim 1, further comprising sending the N-PDU comprising the request for information to the Serving GPRS Support Node (SGSN) when the content of the cache memory in the base station subsystem does not correspond to the request for information indicated by the N-PDU.

* * * * *